(12) United States Patent
Hwang et al.

(10) Patent No.: US 12,107,279 B2
(45) Date of Patent: Oct. 1, 2024

(54) POUCH FILM AND METHOD FOR MANUFACTURING THE SAME

(71) Applicant: LG Chem, Ltd., Seoul (KR)

(72) Inventors: Soo Ji Hwang, Daejeon (KR); Sang Hun Kim, Daejeon (KR); Hyung Kyun Yu, Daejeon (KR); Yong Su Choi, Daejeon (KR); Na Yoon Kim, Daejeon (KR); Min Hyeong Kang, Daejeon (KR); Yong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 3 days.

(21) Appl. No.: 16/499,557

(22) PCT Filed: Nov. 16, 2018

(86) PCT No.: PCT/KR2018/014121
§ 371 (c)(1),
(2) Date: Sep. 30, 2019

(87) PCT Pub. No.: WO2019/139245
PCT Pub. Date: Jul. 18, 2019

(65) Prior Publication Data
US 2020/0044203 A1 Feb. 6, 2020

(30) Foreign Application Priority Data
Jan. 12, 2018 (KR) .......................... 10-2018-0004212

(51) Int. Cl.
*H01M 50/124* (2021.01)
*H01M 50/119* (2021.01)
(Continued)

(52) U.S. Cl.
CPC ....... *H01M 50/124* (2021.01); *H01M 50/119* (2021.01); *H01M 50/121* (2021.01);
(Continued)

(58) Field of Classification Search
CPC .. H01M 50/124; H01M 50/131; H01M 50/14; H01M 50/141; H01M 50/145;
(Continued)

(56) References Cited

U.S. PATENT DOCUMENTS

2005/0191547 A1 9/2005 Konishiike et al.
2008/0063874 A1 3/2008 Rakow et al.
(Continued)

FOREIGN PATENT DOCUMENTS

CN 104396043 A 3/2015
CN 104969378 A 10/2015
(Continued)

OTHER PUBLICATIONS

Claussen et al; "WO2004035309—Composite Metal/Ceramic Product Having Surface Compressive Stresses"; WIPO Patentscope Machine Translation (Year: 2004).*
(Continued)

*Primary Examiner* — Dustin Q Dam
*Assistant Examiner* — Charlene Bermudez
(74) *Attorney, Agent, or Firm* — Lerner David LLP

(57) ABSTRACT

A method for a pouch film according to an embodiment of the present invention includes: a step of applying an adhesive on one surface of a first polymer layer; a step of depositing metal particles on the adhesive; a step of applying heat and a pressure to the deposited metal particles to sinter the metal particles and thereby forming a gas barrier layer; and a step of laminating a second polymer layer on one surface of the gas barrier layer.

8 Claims, 13 Drawing Sheets

(51) Int. Cl.
*H01M 50/121* (2021.01)
*H01M 50/129* (2021.01)
*H01M 50/131* (2021.01)
*H01M 50/55* (2021.01)
*H01M 50/557* (2021.01)

(52) U.S. Cl.
CPC ....... *H01M 50/129* (2021.01); *H01M 50/131* (2021.01); *H01M 50/55* (2021.01); *H01M 50/557* (2021.01)

(58) Field of Classification Search
CPC .. H01M 50/105; H01M 50/10; H01M 50/122; H01M 50/1243; H01M 50/1245; H01M 50/126; H01M 50/103; H01M 50/116; H01M 50/24; H01M 50/00; H01M 10/058; H01M 10/0585; H01M 10/0587; H01M 50/117; H01M 50/119; H01M 50/121; H01M 50/129; H01M 50/136; H01M 50/134; H01M 50/128; H01M 50/133; H01M 50/198; H01M 50/12; B22F 1/0074; B22F 3/15; B22F 2999/00; B22F 1/02; B22F 1/025; B22F 1/0003; B22F 1/0081; B22F 1/0085; B22F 1/0096; B22F 7/00; B22F 7/04; B22F 2998/10; B22F 3/12; B22F 5/006; B22F 3/001; B22F 3/007; B22F 3/10; B22F 3/1035; B22F 3/115; B22F 3/14; B22F 3/156; B22F 7/02; B22F 2003/145; B22F 2003/153; B22F 2303/405; B22F 2304/00; B22F 2304/05; B22F 2304/052; B22F 2304/054; B22F 2304/056; B22F 2304/058; B22F 2304/10; B22F 2304/15; B22F 2303/20; B22F 2303/30; B22F 2303/40; C23C 4/18; C23C 16/56; C23C 16/45525; C23C 16/45527; C23C 24/04; C23C 24/06; C23C 24/08; C23C 24/085; C23C 24/087; C23C 24/10; C23C 24/103; C23C 24/106; C23C 30/00; B32B 7/12; B32B 15/04; B32B 15/08; B32B 15/20; B32B 2457/10

See application file for complete search history.

(56) References Cited

U.S. PATENT DOCUMENTS

| | | | | |
|---|---|---|---|---|
| 2009/0242851 | A1* | 10/2009 | Mayuzumi | C04B 35/6455 252/512 |
| 2010/0189922 | A1 | 7/2010 | Rakow et al. | |
| 2013/0143107 | A1* | 6/2013 | Kuramoto | B32B 15/08 429/163 |
| 2014/0234689 | A1 | 8/2014 | Kim et al. | |
| 2014/0255765 | A1* | 9/2014 | Akita | H01M 50/1245 429/176 |
| 2014/0335391 | A1 | 11/2014 | Kwon et al. | |
| 2015/0372263 | A1* | 12/2015 | Douke | B32B 27/302 429/176 |
| 2016/0049622 | A1* | 2/2016 | Hashimoto | H01M 50/10 429/176 |
| 2016/0199786 | A1* | 7/2016 | Choo | B01D 71/024 205/747 |
| 2016/0311726 | A1 | 10/2016 | Kirby | |
| 2017/0073276 | A1* | 3/2017 | Feigelson | C04B 35/443 |
| 2017/0133711 | A1 | 5/2017 | Gaben | |
| 2017/0271629 | A1 | 9/2017 | Hori et al. | |
| 2017/0288258 | A1* | 10/2017 | Rho | H01M 10/058 |
| 2018/0312943 | A1* | 11/2018 | Amano | H01M 50/126 |

FOREIGN PATENT DOCUMENTS

| | | | | |
|---|---|---|---|---|
| CN | 106537676 | A | 3/2017 | |
| CN | 107078236 | A | 8/2017 | |
| CN | 107828979 | A * | 3/2018 | |
| DE | 102012221753 | A1 * | 5/2014 | .......... B60L 11/1879 |
| EP | 1562250 | A2 | 8/2005 | |
| JP | S62271371 | A | 11/1987 | |
| JP | 2000268784 | A | 9/2000 | |
| JP | 2007090767 | A | 4/2007 | |
| JP | 2008159559 | A | 7/2008 | |
| JP | 2011177992 | A | 9/2011 | |
| JP | 2011195857 | A | 10/2011 | |
| JP | 2012072495 | A | 4/2012 | |
| JP | 2017502194 | A | 1/2017 | |
| JP | 2017024012 | A * | 2/2017 | |
| JP | 2017084786 | A | 5/2017 | |
| JP | 2017100324 | A | 6/2017 | |
| JP | 2017185633 | A | 10/2017 | |
| KR | 101372725 | B1 | 3/2014 | |
| KR | 101519742 | B1 | 5/2015 | |
| KR | 20170082736 | A | 7/2017 | |
| KR | 20170100323 | A | 9/2017 | |
| KR | 20180049810 | A1 * | 11/2017 | .............. H01M 2/02 |
| KR | 20170142624 | A | 12/2017 | |
| RU | 2657894 | C2 * | 6/2018 | |
| WO | WO-2004035309 | A1 * | 4/2004 | ............... C23C 8/10 |
| WO | 2008078948 | A1 | 7/2008 | |
| WO | 2015130362 | A2 | 9/2015 | |
| WO | 2016047790 | A1 | 3/2016 | |
| WO | WO-2017073774 | A1 * | 5/2017 | ............. C22C 21/00 |

OTHER PUBLICATIONS

Takuo Toda; Hideki Nakayama; Yoshihiro Hashizume; "JP2017024012A Method for Manufacturing Powder Press-Molded Body"; Machine Translation of JP 2017024012 A obtained from ESpacenet Patent Translate (Year: 2017).*
Liu et al; "Preparation Method of Copper-Plated Expanded Graphite-Reinforced Metal-Based Composite Material"; Machine translation of CN-107828979-A obtained from WIPO IP Portal (Year: 2018).*
Bazhin et al "RU2657894C2 Method of Manufacturing Slabs of Ceramic and Composite Materials"; Machine translation of RU-2657894-C2 obtained from Espacenet Patent Translate (Year: 2018).*
Lee et al; "KR20180049810A Pouch for Flexible Secondary Battery Flexible Secondary Battery Having the Same and Method of Producing Pouch for Flexible Secondary Battery"; Machine translation of KR20180049810A1 obtained from ESpacenet (Year: 2017).*
Bidet et al; "Description DE102012221753A1"; Machine translation of DE102012221753A1 obtained from ESpacenet Patent Translate (Year: 2012).*
Extended European Search Report including the Written Opinion for Application No. EP 18899839.7 dated Apr. 3, 2020, 8 pages.
International Search Report for Application No. PCT/KR2018/014121, mailed Feb. 21, 2019, pp. 1-2.
Chinese Search Report for Application No. 201880018847.9, dated Aug. 17, 2021, 3 pages.

* cited by examiner

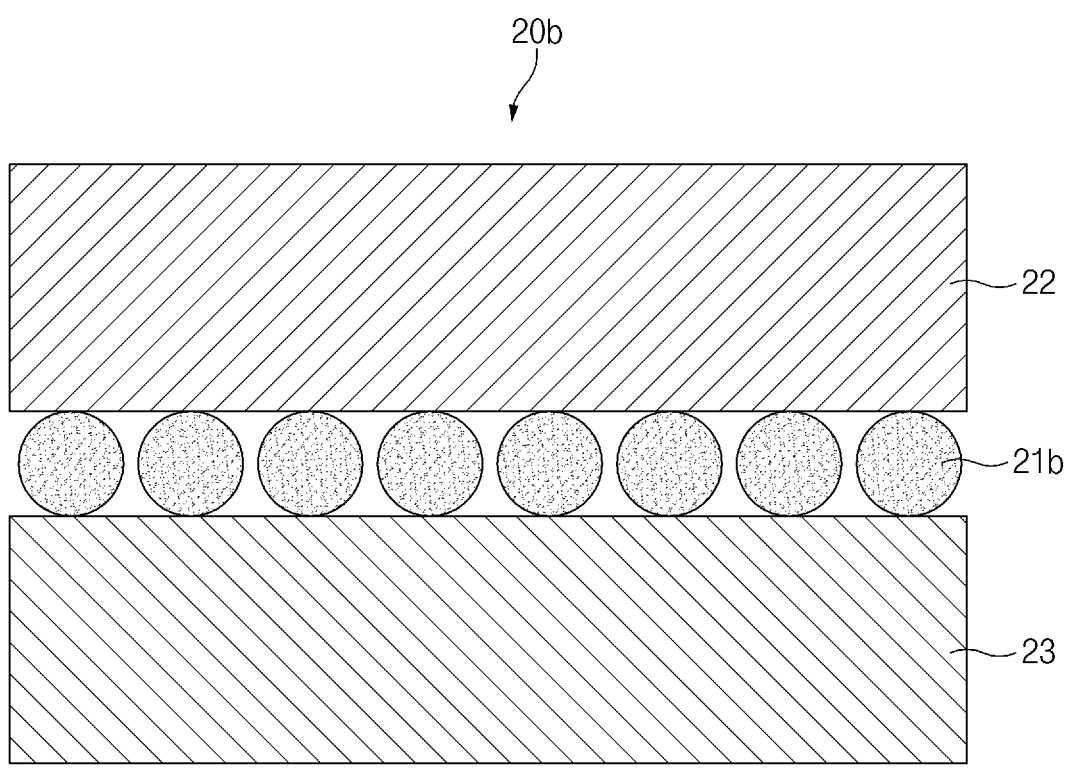
F I G. 13

POUCH FILM AND METHOD FOR MANUFACTURING THE SAME

CROSS-REFERENCE TO RELATED APPLICATION

The present application is a national phase entry under 35 U.S.C. § 371 of International Patent Application No. PCT/KR2018/014121, filed on Nov. 16, 2018, published in Korean, which claims priority from Korean Patent Application No. 10-2018-0004212, filed on Jan. 12, 2018, the disclosures of which are hereby incorporated herein by reference in their entireties.

TECHNICAL FIELD

The present invention relates to a pouch film and a method for manufacturing the same, and more particularly, to a pouch film, in which a pouch has excellent flexibility, waterproofness, and electrolyte resistance, and a method for manufacturing the same.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

In general, the pouch includes a gas barrier layer, a surface protection layer, and a sealant layer. The gas barrier layer is configured to block introduction and discharge of a gas and includes a metal. Thus, aluminum (Al) foil is mainly used as the gas barrier layer. The surface protection layer is disposed on the outermost layer to protect the electrode assembly against external friction and collision. Thus, a polymer such as a nylon resin, PET, or the like having abrasion resistance and heat resistance is mainly used for the surface protection layer. Also, the sealant layer is disposed on the innermost layer and directly contacts the electrode assembly. Thus, a polymer such as polypropylene (PP) or the like is mainly used for the sealant layer.

In recent years, as interest in flexible electronic devices increases, studies on flexible secondary batteries is being also actively conducted. However, the pouch of the secondary battery according to the related art has low flexibility. As a result, when the pouch is bent several times, the pouch may be cut or broken. To solve this problem, techniques in which the gas barrier layer is formed by depositing metal particles have been proposed. However, there has been a problem that moisture and other foreign substances are easily permeated because a gap is generated between the deposited metal particles. Particularly, there has been a problem that an electrolyte injected into the pouch is permeated between the metal particles to cause corrosion and damage of the gas barrier layer.

DISCLOSURE OF THE INVENTION

Technical Problem

An object to be solved by the present invention is to provide a pouch film, in which a pouch has excellent flexibility, waterproofness, and electrolyte resistance, and a method for manufacturing the same.

The objects of the present invention are not limited to the aforementioned object, but other objects not described herein will be clearly understood by those skilled in the art from descriptions below.

Technical Solution

To solve the above problems, a method for a pouch film according to an embodiment of the present invention includes: a step of applying an adhesive on one surface of a first polymer layer; a step of depositing metal particles on the adhesive; a step of applying heat and a pressure to the deposited metal particles to sinter the metal particles and thereby forming a gas barrier layer; and a step of laminating a second polymer layer on one surface of the gas barrier layer.

Also, the first polymer layer may be a surface protection layer that is an outermost layer of the pouch film, and the second polymer layer may be a sealant layer that is an innermost layer of the pouch film.

Also, the first polymer layer may be a sealant layer that is an innermost layer of the pouch film, and the second polymer layer may be a surface protection layer that is an outermost layer of the pouch film.

Also, the metal particles may include aluminum.

Also, each of the metal particles may have a diameter of 0.01 μm to 15 μm.

Also, during the step of forming the gas barrier layer, the heat that is applied to the deposited metal particles may have a temperature of 50° C. to 200° C.

Also, during the step of forming the gas barrier layer, the pressure that is applied to the deposited metal particles may be 50 MPa to 1000 MPa.

Also, the pressure may range of 100 MPa to 500 MPa.

To solve the above problems, a pouch film includes: a first polymer layer; an adhesive layer disposed on one surface of the first polymer layer; a gas barrier layer disposed on the adhesive layer and including a sintered body of metal particles; and a second polymer layer laminated on one surface of the gas barrier layer.

Also, the first polymer layer may be a surface protection layer that is an outermost layer of the pouch film, and the second polymer layer may be a sealant layer that is an innermost layer of the pouch film.

Also, the first polymer layer may be a sealant layer that is an innermost layer of the pouch film, and the second polymer layer may be a surface protection layer that is an outermost layer of the pouch film.

Also, each of the metal particles of the gas barrier layer may have a diameter of 0.01 μm to 15 μm.

Also, the first polymer layer or the second polymer layer may be a sealant layer that is an innermost layer of the pouch film, and an adhesive strength between the sealant layer and the gas barrier layer, measured after being impregnated in an electrolyte for 24 hours at a temperature of 85° C., may be 3 N/15 mm to 4.5 N/15 mm.

Also, a water vapor transmission rate (WVTR) of the pouch film, measured under a temperature of 38° C. and a relative humidity of 100%, may be $7\times10^{-3}$ g/m2/day to $9\times10^{-3}$ g/m$^2$/day.

To solve the above problems, a secondary battery according to an embodiment of the present invention include a battery case manufactured using the pouch film.

Particularities of other embodiments are included in the detailed description and drawings.

Advantageous Effects

The embodiments of the present invention may have at least the following effects.

The pouch may be improved in flexibility, waterproofness, and electrolyte resistance.

Also, the pouch may be manufactured with the thin thickness.

The effects of the prevent invention are not limited by the aforementioned description, and thus, more varied effects are involved in this specification.

BRIEF DESCRIPTION OF THE DRAWINGS

FIG. 13 is a cross-sectional view of a pouch film manufactured by laminating the sealant layer without sintering the deposited metal particles.

MODE FOR CARRYING OUT THE INVENTION

Figure 1:
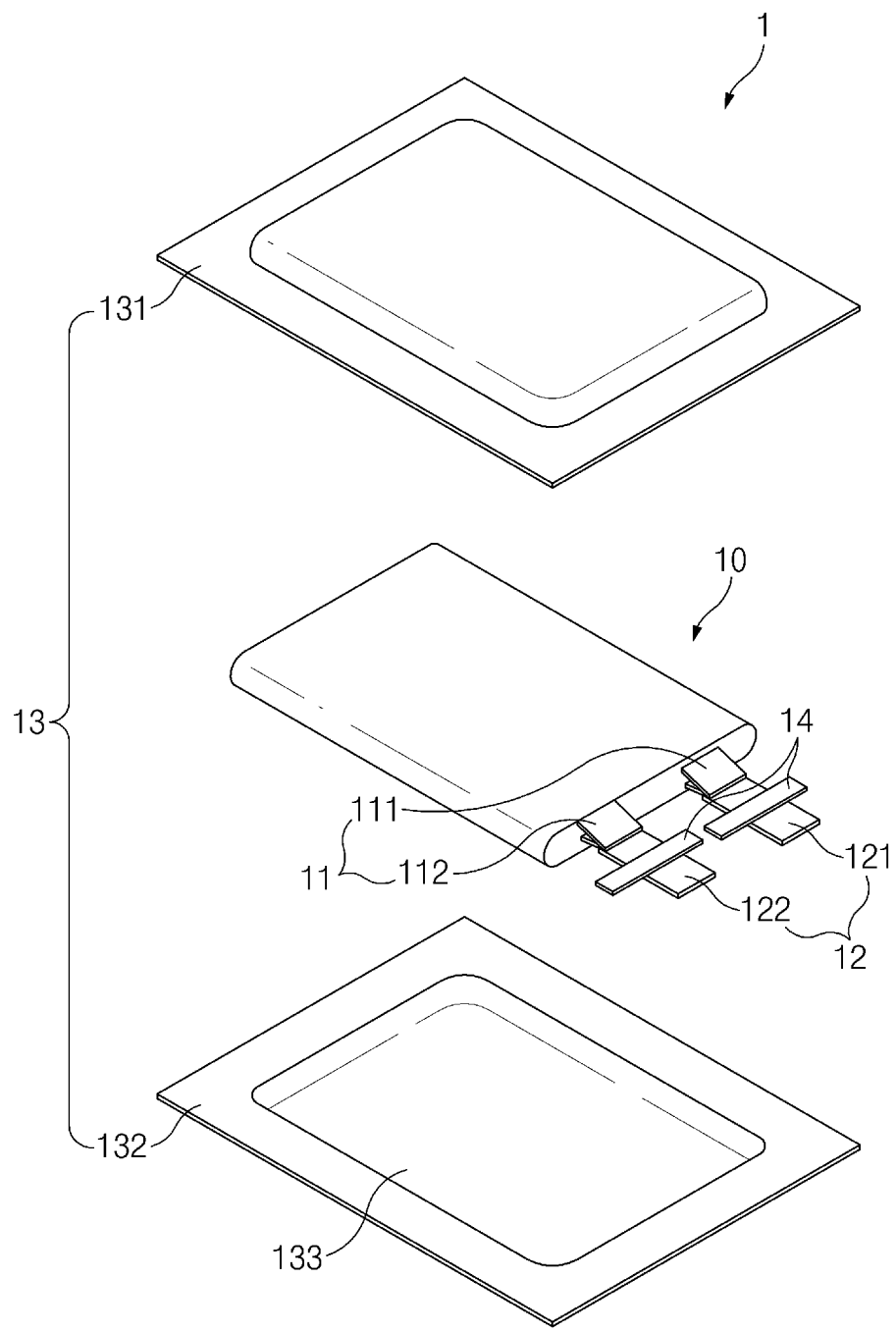
FIG. 1 is an assembled view of a pouch type secondary battery according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 2:
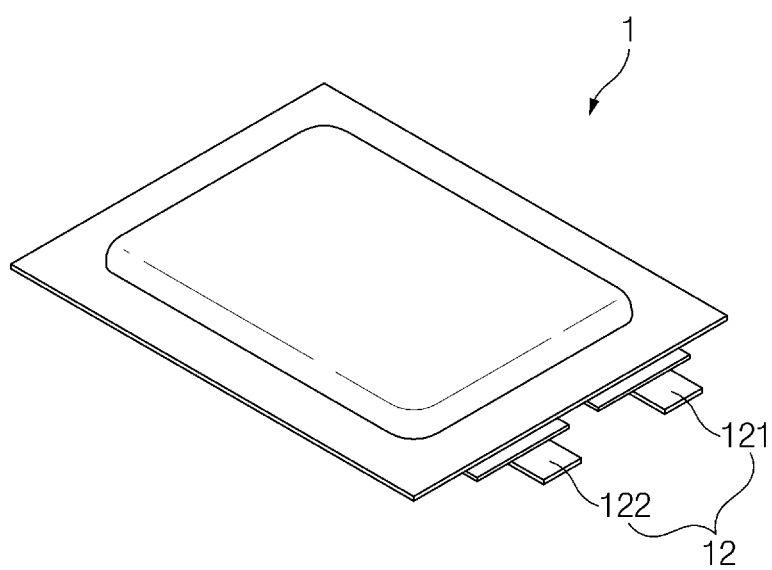
FIG. 2 is a perspective view of the pouch type secondary battery of FIG. 1, which is completely manufactured.

FIG. 1 is an assembling view of a pouch type secondary battery 1 according to an embodiment of the present invention, and FIG. 2 is a perspective view of the pouch type secondary battery 1 of FIG. 1, which is completely manufactured.

In general, in order to manufacture the lithium secondary battery 1, first, slurry in which an electrode active material, a binder, and a plasticizer are mixed is applied to a positive electrode collector and a negative electrode collector to manufacture a positive electrode and a negative electrode. Then, a separator is laminated on both sides to form an electrode assembly 10. Also, the electrode assembly 10 is accommodated in a battery case, and an electrolyte is injected. Then, sealing is performed.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons moves, between the inside and outside of the electrode assembly 10. The electrode collector of the electrode assembly 10 is constituted by a portion coated with the slurry and a distal end, on which the slurry is not applied, i.e., a non-coating portion. Also, the electrode tab 111 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. The insulation part 14 may be disposed to be limited within a sealing part, at which an upper pouch 131 and a lower pouch 132 are thermally fused, so that the electrode lead 12 is bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive current collector, i.e., an aluminum (Al) material, and the negative electrode lead 122 may be made of the same material as the negative current collector, i.e., a copper (Cu) material or a copper material coated with nickel (Ni). Also, a portion of the electrode lead 12, which protrudes to the outside of the battery case 13, may be provided as a terminal part and electrically connected to an external terminal.

In the pouch type secondary battery 1 according to an embodiment of the present invention, the battery case 13 may be a pouch made of a flexible material. Hereinafter, the case in which the battery case 13 is the pouch will be described. Also, th battery case 13 accommodates the electrode assembly 10 so that a portion of the electrode lead 12, i.e., the terminal part is exposed and then is sealed. As illustrated in FIG. 1, the battery case 13 includes the upper pouch 131 and the lower pouch 132. An accommodation space 133 in which the electrode assembly 10 is accommodated may be provided in the lower pouch 132, and upper pouch 131 may cover an upper side of the accommodation space 133 so that the electrode assembly 10 is not separated to the outside of the battery case 13. Here, as illustrated in FIG. 1, an accommodation space may also be provided in the upper pouch 131 to accommodate the electrode assembly 10 through an upper side of the upper pouch 131. As illustrated in FIG. 1, the upper pouch 131 and the lower pouch 132 may be separately provided, but the present invention is not limited thereto. For example, the upper pouch 131 and the lower pouch 132 may be manufactured through various manners, that is, one side of the upper pouch 131 and one side of the lower pouch 132 may be connected to each other.

When the electrode lead 12 is connected to the electrode tab 11 of the electrode assembly 10, and the insulation part 14 is provided on a portion of the electrode lead 12, the electrode assembly 10 may be accommodated in the accommodation space 133 provided in the lower pouch 132, and the upper pouch 131 may cover the upper side of the accommodation space 133. Also, when the electrolyte is injected, and the sealing part provided on an edge of each of the upper pouch 131 and the lower pouch 132 is sealed to manufacture the secondary battery 1 as illustrated in FIG. 2.

Figure 3:
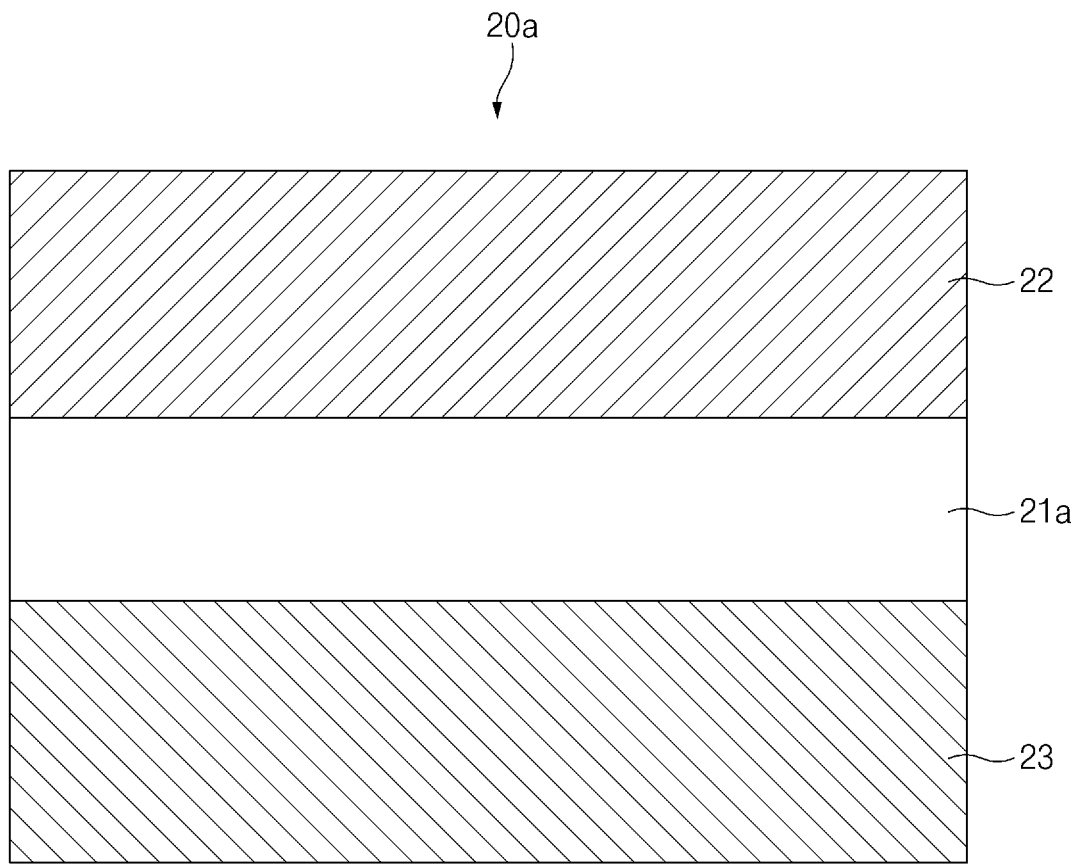
FIG. 3 is a cross-sectional view of a pouch film for a secondary battery according to a related art.

FIG. 3 is a cross-sectional view of a pouch film 20a for a secondary battery according to a related art.

In general, as illustrated in FIG. 3, a battery case 13 accommodating an electrode assembly 10 is manufactured by elongating a pouch film 20a in which a first polymer layer, a gas barrier layer 21a, and a second polymer layer are sequentially laminated. Also, the polymer layer disposed at the outermost layer of the first and second polymer layers is provided as a surface protection layer 22, and the polymer layer disposed at the innermost layer may be provided as a sealant layer 23. The "the first" and "the second" only indicate that two configurations are different from each other and are not intended to fix the name.

The gas barrier 21a may secure mechanical strength of the battery case 13, block introduction and discharge of gas or moisture outside the secondary battery, and prevent an electrolyte from leaking. In general, the gas barrier layer 21a includes a metal. Particularly, aluminum (Al) is mainly used for the gas barrier layer 21a. Aluminum may secure the mechanical strength of a predetermined level or more, but be light in weight. Thus, aluminum may secure complement and heat dissipation for electrochemical properties of the electrode assembly 10 and the electrolyte.

In recent years, as interest in flexible electronic devices increases, studies on flexible secondary batteries is being also actively conducted. However, according to the related art, as illustrated in FIG. 3, a metal foil, particularly, an Al foil is used for manufacture the gas barrier layer 21a. When the gas barrier layer 21a is manufactured by using the Al foil, the pouch is limited in flexibility. Thus, when the pouch is bent several times, the pouch may be cut or damaged. In addition, it is difficult to manufacture an Al foil having a thickness less than 15 μm with the current technologies, and thus, there is a limit in more improving the flexibility of the pouch.

Thus, according to the present invention, the gas barrier layer 21 is manufactured by depositing metal particles 210 on the first polymer layer instead of the metal thin film and then sintering the first polymer layer on which the metal particles 210 are deposited.

Particularly, a method for manufacturing a pouch film 20 for a secondary battery according to the present invention includes a step of applying an adhesive on one surface of a first polymer layer, a step of depositing metal particles 210 on the applied adhesive, a step of applying heat and a pressure to the deposited metal particles 210 to sinter the metal particles and thereby to form a gas barrier layer 21, and a step of laminating a second polymer layer on one surface of the gas barrier layer 21.

According to an embodiment of the present invention, the first polymer layer is provided as a surface protection layer 22 that is disposed at the outermost layer, and the second polymer layer is provided as a sealant layer 23 that is disposed at the innermost layer. According to another embodiment of the present invention, the first polymer layer may be provided as the sealant layer 23 that is disposed at the innermost layer, and the second polymer layer may be provided as the surface protection layer 22 that is disposed at the outermost layer.

Figure 4:
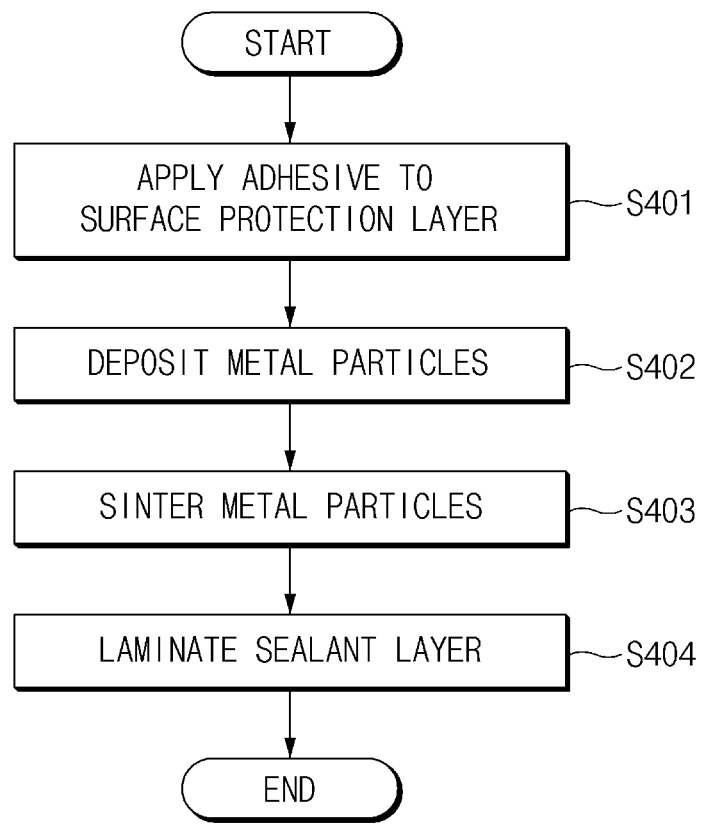
FIG. 4 is a flowchart illustrating a method for manufacturing a pouch film for a secondary battery according to an embodiment of the present invention.

FIG. 4 is a flowchart illustrating a method for manufacturing a pouch film 20 for a secondary battery according to an embodiment of the present invention.

Hereinafter, each of the steps illustrated in the flowchart of FIG. 4 will be described with reference to FIGS. 5 to 9.

Figure 5:
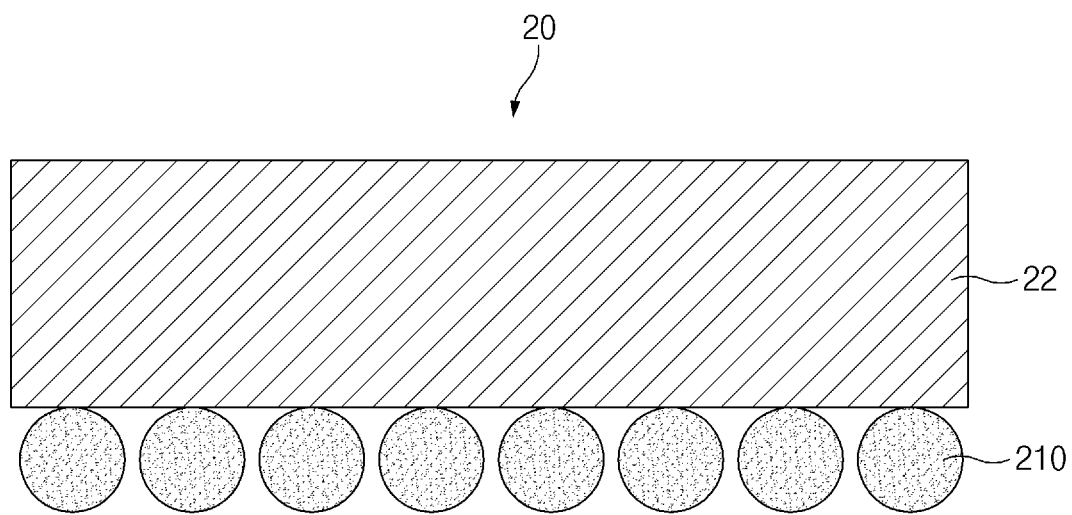
FIG. 5 is a cross-sectional view illustrating a process of depositing metal particles on a surface protection layer to manufacture the pouch film for the secondary battery according to an embodiment of the present invention.

FIG. 5 is a cross-sectional view illustrating a process of depositing metal particles 210 on a surface protection layer 22 to manufacture the pouch film 20 for the secondary battery according to an embodiment of the present invention.

First, an adhesive is applied on one surface of the first polymer layer to form an adhesive layer (not shown) (S401), and the metal particles 210 is deposited on the applied adhesive (S402). According to an embodiment of the present invention, the first polymer layer may be the surface protection layer 22 that is disposed at the outermost layer as illustrated in FIG. 5.

The surface protection layer 22 is made of a polymer and disposed at the outermost layer to protect the secondary battery 1 against external friction and collision and also electrically insulates the electrode assembly 10 from the outside. Here, the outermost layer represents a direction opposite to a direction in which the electrode assembly 10 is disposed with respect to the gas barrier layer 21, i.e., in an outward direction. The surface protection layer 22 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as a nylon resin or polyethylene terephthalate (PET) having mainly abrasion resistance and heat resistance is used. Also, the surface protection layer 22 may have a single layer structure made of one material or a composite layer structure in which two or more materials are respectively formed as layers.

The metal particles 210 are made of one or more materials selected from the group consisting of aluminum (Al), iron (Fe), molybdenum (Mo), stainless steel, chromium (Cr), manganese (Mn), and nickel (Ni). Particularly, as descried above, aluminum may secure the mechanical strength of a predetermined level or more, but be light in weight. Thus, aluminum may secure complement and heat dissipation for electrochemical properties of the electrode assembly 10 and the electrolyte. Thus, the metal particles 210 may preferably include aluminum (Al). Also, in order to uniformly deposit the metal particles 210, each of the metal particles 210 may have a diameter of 0.01 μm to 15 μm, preferably, 0.01 μm to 10 μm. When the metal particle 210 has a diameter of 15 μm or more, a pore generated between the metal particles 210 may be too large. In addition, since it is difficult to manufacture the metal particle 20 having a diameter of 0.01 μm or less, manufacturing costs may increase.

When the metal particles 210 are deposited, a binder may be mixed to be deposited together with the metal particles 210. The binder may be made of a material selected from the group consisting of polyethylene (PE), polypropylene (PP), stearic acid (SA), polyethylene glycol (PEG), polyacetal (PA), paraffin wax And carnauba wax (CW).

The method for depositing the metal particles 210 may include various methods such as a rotating electrode method, a rotating disc method, a water atomization method, a gas atomization method, a plasma atomization method, a spark erosion method, and the like. Particularly, when the metal particle 210 has a diameter of 0.01 μm to 10 μm as described above, the water atomization method, the water atomization method, the plasma atomization method, or the spark erosion method may be preferably used. However, the present invention is not limited thereto. For example, various deposition methods may be used as long as the metal particles 210 is capable of being deposited on one surface of the first polymer layer.

Furthermore, although the metal particles 210 are directly deposited on the adhesive after the adhesive is applied to one surface of the first polymer layer, i.e., the surface protection layer 22 in FIG. 5, the embodiment of the present invention is not limited thereto. For example, after at least one separate layer is further laminated on the one surface of the protection layer 22, the adhesive may be applied, and then the metal particles 210 may be deposited. Here, the separate layer may include other polymer, synthetic rubber, a metal, or the like.

Figure 6:
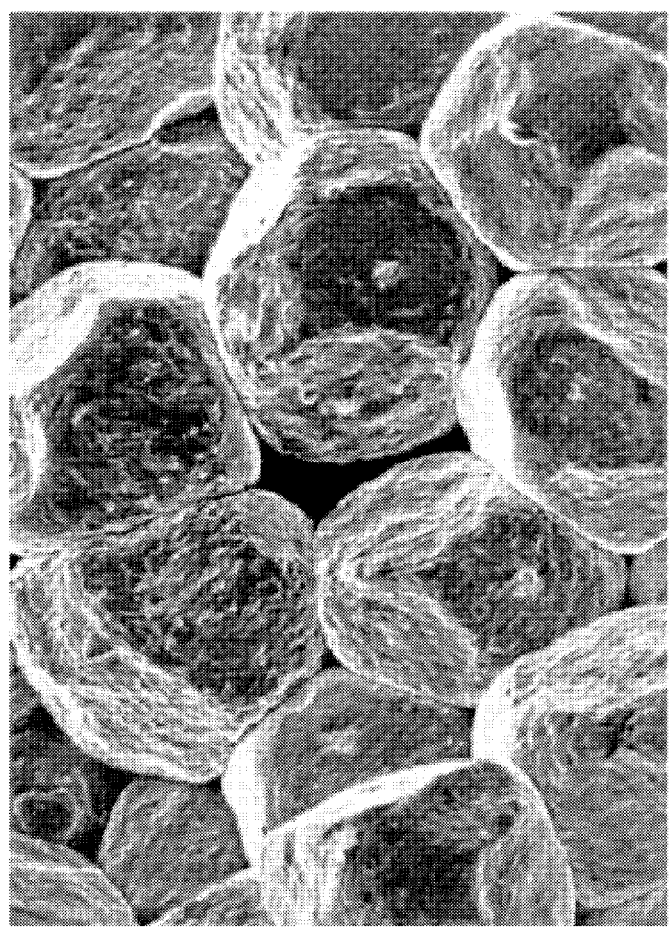
FIG. 6 is an SEM photograph illustrating a state after the metal particles are deposited in FIG. 5.

FIG. 6 is an SEM photograph illustrating a state after the metal particles 210 are deposited in FIG. 5.

As illustrated in FIG. 6, it is seen that pores are generated between the deposited metal particles 210 when the metal particles 210 are deposited. When the pore are generated between the metal particles 210, moisture or an electrolyte may be easily permeated through the pores, and thus, the gas barrier layer 21 may be corroded or damaged.

To solve this problem, according to an embodiment of the present invention, in addition to the deposition of the metal particles 210, a sintering process may be further performed (S403). The sintering is a phenomenon in which, when powder or particles are heated at a temperature below the point at which the powder or particles are compressed and melted, the powder or particles adhere to each other while being melted and thus are solidified. The method for sintering the metal particles 210 may include various sintering methods such as a normal sintering method, a reactive sintering method, a pressure sintering method, an isostatic pressure sintering method, a gas pressure sintering method, a re-sintering method, an impact compression sintering method, and the like, but is not limited thereto.

The temperature of the heat and the pressure, which are applied to perform the sintering may vary depending on the material of the metal particles 210, but the adequate sintering temperature is 50° C. to 200° C., preferably, 100° C. to 150° C. Also, the adequate sintering pressure is 50 MPa to 1,000 MPA, preferably, 100 MPa to 500 MPa. If the sintering temperature is less than 50° C., the sintering may not be properly performed. If the sintering temperature exceeds 200° C., the surface protection layer 22 may be damaged. Also, when the pressure is less than 50 MPa, since the pores between the metal particles 210 are not removed, a fractional density may be lowered. When the pressure exceeds 1,000 MPa, the surface protection layer 22 may be damaged.

Figure 7:
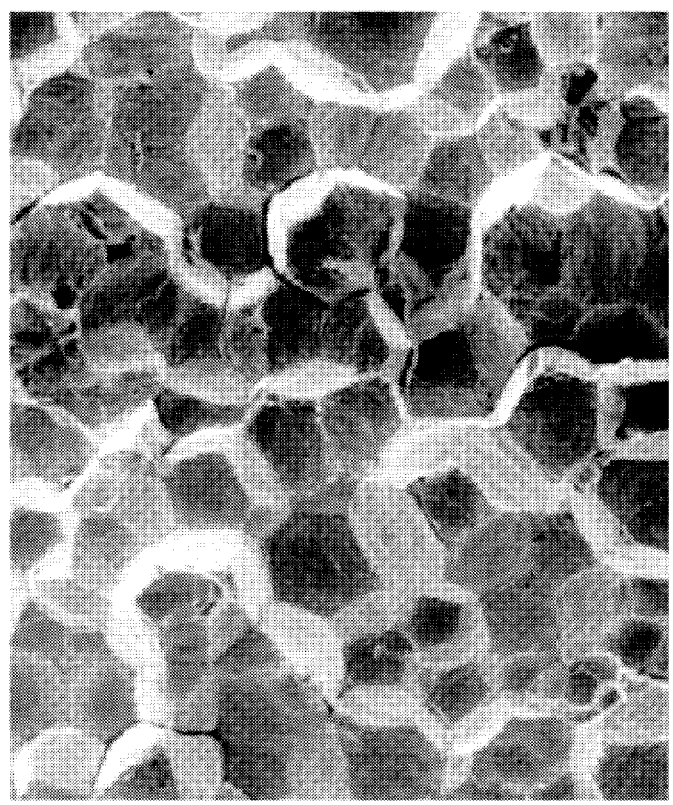
FIG. 7 is an SEM photograph illustrating a state after the metal particles are sintered.
Figure 8:
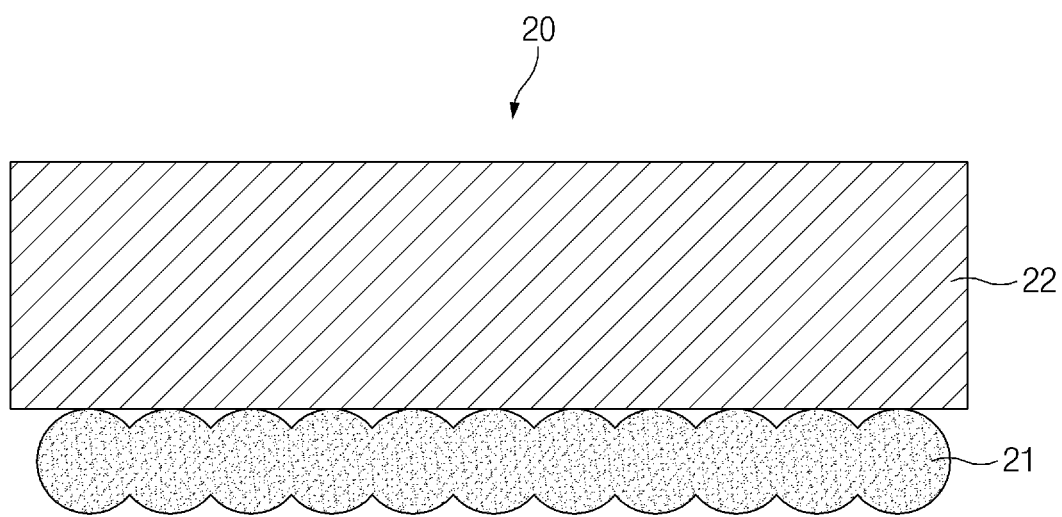
FIG. 8 is a cross-sectional view illustrating a state in which the deposited metal particles are sintered to form a gas barrier layer.

FIG. 7 is an SEM photograph illustrating a state after the metal particles 210 are sintered, and FIG. 8 is a cross-sectional view illustrating a state in which the deposited metal particles 210 are sintered to form the gas barrier layer 21.

As illustrated in FIG. 7, when the sintering process is performed, the pores between the metal particles 210 may be removed to allow the particles to be closely attached to each other. Thus, as illustrated in FIG. 8, the gas barrier layer 21 of the pouch film 20 according to an embodiment of the inventive concept may include a sintered body.

Figure 9:
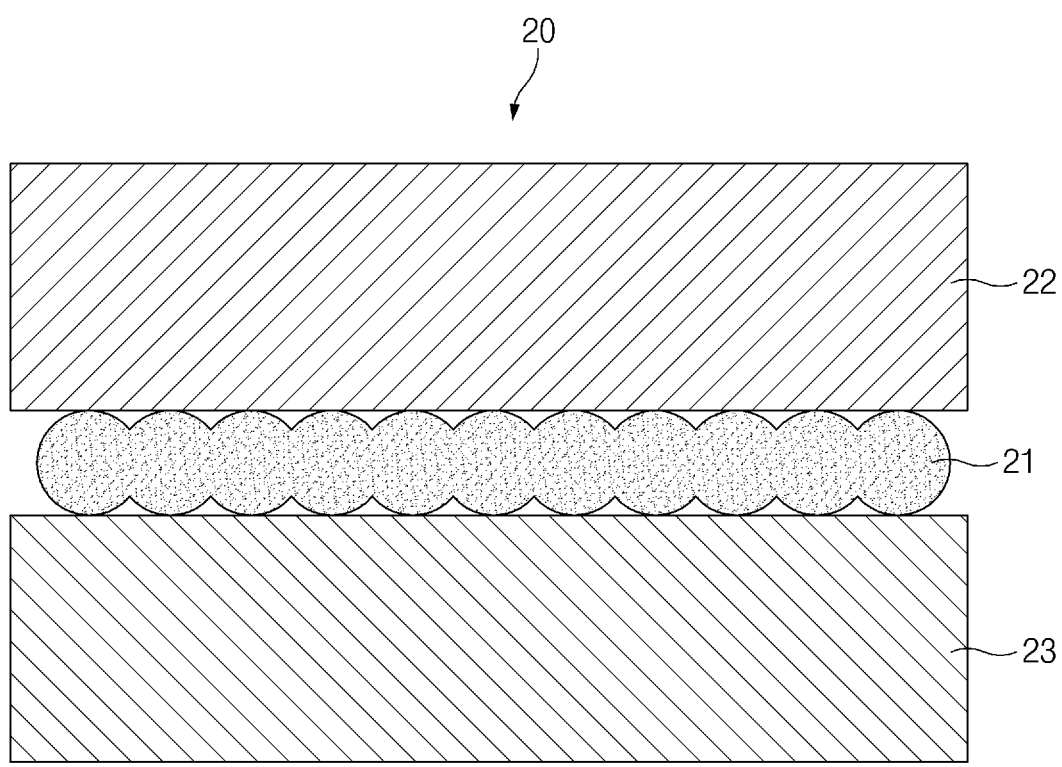
FIG. 9 is a cross-sectional view of a pouch film for the secondary battery according to the present invention, which is manufactured by laminating a sealant layer on the gas barrier layer in FIG. 7.

FIG. 9 is a cross-sectional view of the pouch film 20 for the secondary battery according to the present invention, which is manufactured by laminating the sealant layer 23 on the gas barrier layer 21 in FIG. 7.

The adhesive is applied to one surface of the gas barrier layer 21 or one surface of the sealant layer 23, and a second polymer layer is laminated (S404). According to an embodiment of the present invention, the second polymer layer may be the sealant layer 23 that is disposed at the innermost layer as illustrated in FIG. 9. Then, the pouch film 20 according to an embodiment of the present invention is completely manufactured.

The sealant layer 23 is made of a polymer and disposed at the innermost layer to directly contact the electrode assembly 10. The pouch type battery case 13 may be manufactured while a portion thereof is elongated to form an accommodation space 133 having a bag shape when a pouch film 20a having the lamination structure as described above is drawn by using punch or the like. Also, when the electrode assembly 10 is accommodated in the accommodation space 133, the electrolyte is injected. Thereafter, when the upper pouch 131 and the lower pouch 132 may contact each other, and thermal compression is applied to the sealing part, the sealant layers may be bonded to each other to seal the battery case 13. Here, since the sealant layer 23 directly contacts the electrode assembly 10, the sealant layer 23 may have to have insulating properties. Also, since the sealant layer 23 contacts the electrolyte, the sealant layer 23 may have to have corrosion resistance. Also, since the inside of the battery case 13 is completely sealed to prevent materials from moving between the inside and outside of the battery case 13, high sealability has to be realized. That is, the sealing part on which the sealant layers 23 are bonded to each other has to have superior thermal bonding strength. In general, the sealant layer 23 may be made of at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) may be used for the sealant layer 23. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 23. Furthermore, the sealant layer 23 may be made of a cated polypropylene or a polypropylene-butylene-ethylene terpolymer. Also, the sealant layer 23 may have a single layer structure made of one material or a composite layer structure in which two or more materials are respectively formed as layers.

Although the second polymer layer, i.e., the sealant layer 23 is directly laminated on the one surface of the gas barrier layer 21 in FIG. 9, the embodiment of the present invention is not limited thereto. For example, at least one separate layer may be further laminated on the one surface of the barrier layer 21, and then, the sealant layer 23 may be laminated. That is, the separate layer may be further provided between the surface protection layer 22 and the gas barrier layer 21 or between the gas barrier layer 21 and the sealant layer 23, and thus, the pouch film 20 may include four or more layers. Here, the separate layer may include other polymer, synthetic rubber, a metal, or the like.

Figure 10:
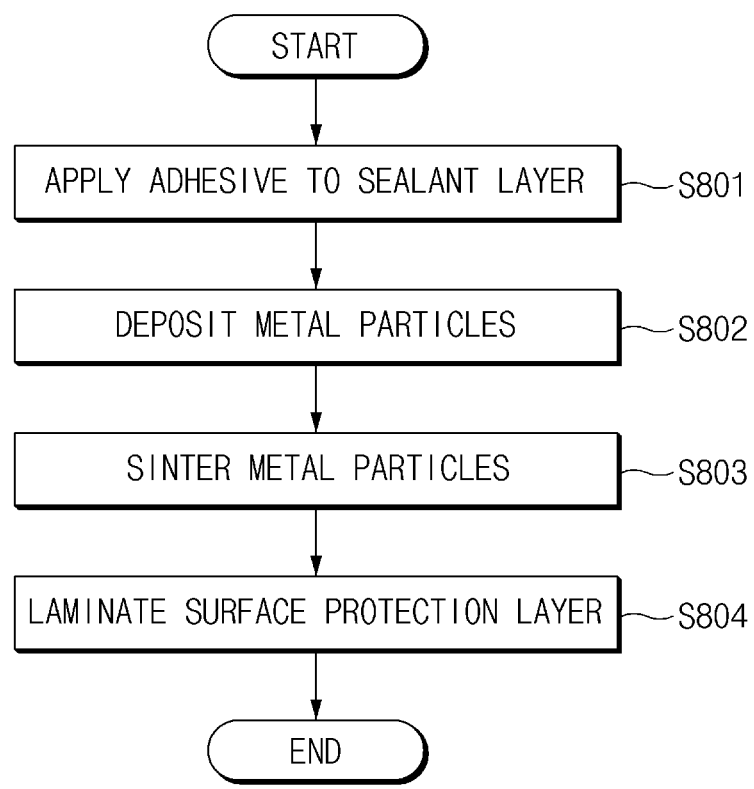
FIG. 10 is a flowchart illustrating a method for manufacturing a pouch film for a secondary battery according to another embodiment of the present invention.

FIG. 10 is a flowchart illustrating a method for manufacturing a pouch film 20 for a secondary battery according to another embodiment of the present invention.

According to an embodiment of the present invention, metal particles 210 are deposited on one surface of a surface protection layer 22 and then sintered to form a gas barrier layer 21. However, in the pouch film 20 for the secondary battery according to another embodiment of the present invention, the metal particles 210 are deposited on one surface of the sealant layer 23 but one surface of the surface protection layer 22 and then sintered to manufacture the gas barrier layer 21.

Hereinafter, each of the steps illustrated in FIG. 10 will be described with reference to FIGS. 11 to 13.

Figure 11:
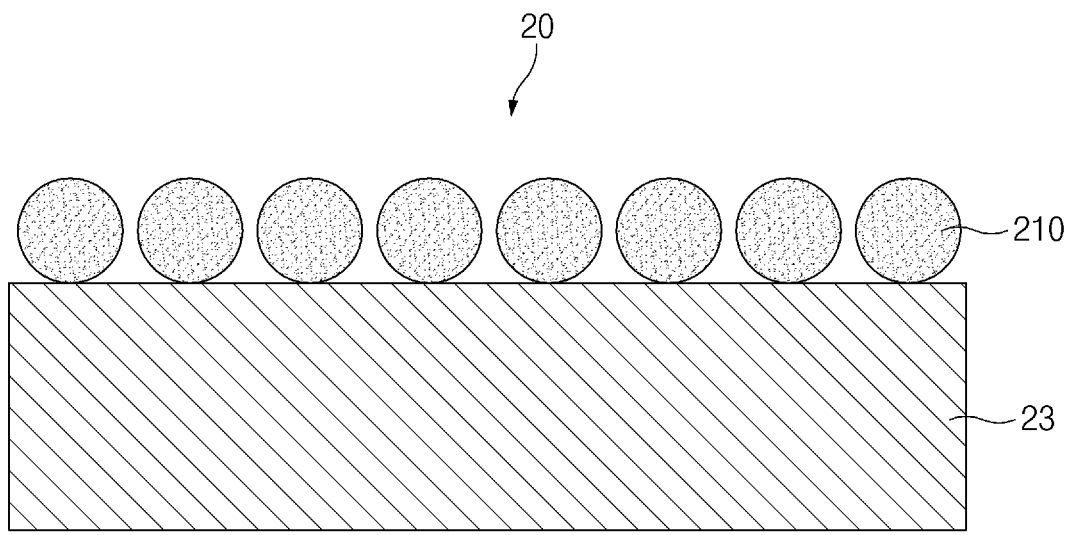
FIG. 11 is a cross-sectional view illustrating a process of depositing metal particles on a sealant layer to manufacture the pouch film for the secondary battery according to another embodiment of the present invention.

FIG. 11 is a cross-sectional view illustrating a process of depositing metal particles 210 on a surface protection layer 23 to manufacture the pouch film 20 for the secondary battery according to another embodiment of the present invention.

In order to manufacture the pouch film 20, first, an adhesive is applied to one surface of a first polymer layer (S801), and metal particles 210 are deposited (S802). According to another embodiment of the present invention, the first polymer layer may be a sealant layer 23 that is disposed at the innermost layer as illustrated in FIG. 11.

When the metal particles 210 are deposited, a binder may be mixed to be deposited together with the metal particles 210. Hereinafter, duplicated description with those of the pouch film 20 according to the abovementioned embodiment of the present invention will be omitted. However, this is merely for convenience of explanation and is not intended to limit the scope of rights.

Figure 12:
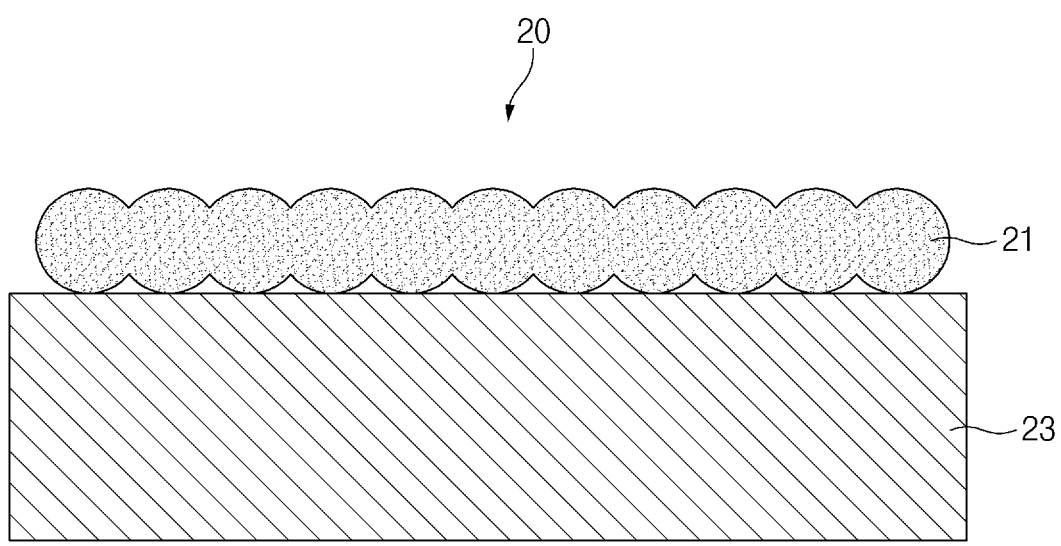
FIG. 12 is a cross-sectional view illustrating a state in which the deposited metal particles are sintered to form a gas barrier layer in FIG. 11.

FIG. 12 is a cross-sectional view illustrating a state in which the deposited metal particles are sintered to form a gas barrier layer 21 in FIG. 11.

According to another embodiment of the present invention, a process of sintering the deposited metal particles 210 is performed (S803). As described above, when the metal particles 210 are sintered, pores between the metal particles 210 may be removed to allow the particles to be closely attached to each other. Thus, the gas barrier layer 21 of the pouch film 20 according to another embodiment of the inventive concept may include a sintered body.

The adhesive is applied to one surface of the gas barrier layer 21 or one surface of a second polymer layer, and then, the second polymer layer is laminated (S804). According to another embodiment of the present invention, the second polymer layer may be a surface protection layer 22 that is disposed at the outermost layer as illustrated in FIG. 9. Thus, as illustrated in FIG. 9, the pouch film 20 according to another embodiment of the present invention is completely manufactured.

The pouch film 20 manufactured through the above-described method according to the present invention includes a first polymer layer; an adhesive layer disposed on one surface of the first polymer layer; a gas barrier layer 21 disposed on the adhesive layer and including a sintered body of metal particles 210; and a second polymer layer laminated on one surface of the gas barrier layer 21. Since specific specifications of the first polymer layer, the adhesive layer, the gas barrier layer 21, and the second polymer layer are the same as described above, their detailed descriptions will be omitted.

In the pouch film 20 according to the present invention, the metal particles 210 are deposited and sintered to manufacture the gas barrier layer. Thus, the gas barrier layer may be thinner when compared to the of the gas barrier layer of the pouch film according to the related art. Particularly, according to the present invention, the gas barrier layer 21 has a thickness of 0.01 μm to 15 μm, preferably, 1 μm to 14 μm. Also, when the gas barrier layer has a thickness that satisfies the above range, excellent flexibility may be realized.

Also, in the pouch film 20 according to the present invention, since the gas barrier layer 21 includes the sintered body that is sintered after depositing the metal particles 210, pores may not exist between the metal particles 210, and since permeability of an electrolyte or moisture is low, a waterproof property and electrolytic resistance are excellent.

Particularly, the pouch film 20 according to the present invention has adhesive strength of 3 N/15 mm to 4.5 N/15 mm, preferably, 3.1 N/15 mm to 3.9 N/15 mm between the sealant layer 23 and the gas barrier layer 21, which is measured after being impregnated in the electrolyte for 24 hours at a temperature of 85° C.

Also, the pouch film according to the present invention may have moisture permeability (i.e., water vapor transmission rate (WVTR)) of $7\times10^{-3}$ g/m$^2$/day to $9\times10^{-3}$ g/m$^2$/day, preferably, $8\times10^{-3}$ g/m$^2$/day to $8.5\times10^{-3}$ g/m$^2$/day, which is measured under conditions of a temperature of 38° C. and a relative humidity of 100%.

Manufacturing Example 1

An adhesive was applied to one surface of a surface protection layer made of polyethylene terephthalate (PET), and aluminum (Al) metal particles, each of which has a diameter of 0.1 μm to 10 μm were deposited by using a plasma atomization method. Thereafter, a temperature of 150° C. and a pressure of 200 MPa were maintained, and the metal particles were sintered by using a pressure sintering method to form a gas barrier layer. Here, the formed gas barrier layer was measured to a thickness of 10 μm. Then, an adhesive was applied on one surface of the gas barrier layer, and a sealant layer made of polypropylene (PP) was laminated to manufacture a pouch film.

Comparative Manufacturing Example 1

An adhesive was applied to one surface of a surface protection layer made of polyethylene terephthalate (PET), an aluminum foil (Al foil) having a thickness of 15 μm was laminated on the adhesive on the one side of the surface protection layer, an adhesive was applied on the aluminum thin film, and a sealant layer made of polypropylene (PP) is laminated to manufacture a pouch film having the structure of FIG. 3.

Comparative Manufacturing Example 2

A pouch film was manufactured through the same manner as Manufacturing Example 1, except that the sintering process was not performed after depositing the metal particles. The pouch film manufactured as described above has the structure of FIG. 13.

The physical properties of the pouch films manufactured through Manufacturing Example 1 and Comparative Manufacturing Examples 1 and 2 were measured by following methods. The measurement results were shown in Table 1 below.

Physical Property

1. Flexibility

A bending test was performed as described below to measure flexibility. First, each of the pouch films manufactured through Manufacturing Example 1 and Comparative Manufacturing Examples 1 and 2 was cut to a size of 15 mm×150 mm. Then, one side of each of the pouch films was fixed to an upper jig of an MIT folding endurance tester, and the other side of each of the pouch films was fixed to a lower fixing jig (a tip has a curvature radius of 0.1 mm and a load of 250 g). Also, the pouch films were repeatedly bent at an angle of ±90° and at the same speed of 175 cpm. After repeating the bending, LED light was irradiated to each of the pouch films to measure the number of times of bending immediately before pinholes are generated.

2. Electrolyte Resistance

Each of the pouch films manufactured through Manufacturing Example 1 and Comparative Manufacturing Examples 1 and 2 was cut to a size of 25 mm×100 mm. Then, 80 ml of an electrolyte (1 M of lithium salt (LiPF6) and a mixture, in which ethylene carbonate (EC)):ethyl methyl carbonate (EMC):dimethyl carbonate (DMC) are mixed at a ratio of 3:3:4, are melted) and the pouch films were accommodated in a Nalgene bottle having a capacity of 125 ml and then sealed with paraffin. The Nalgene bottle was sealed with an aluminum wrapper and stored at a temperature of 85° C. for 24 hours. Then, the pouch films were taken out and rinsed in water, and the water was completely removed. Also, each of the pouch films was cut by a width of 5 mm from both sides thereof to manufacture a sample having a size of 15 mm×100 mm. Then, a surface protection layer of the sample was sheathed, repeatedly bent, and cut up to a gas barrier layer. Then, the sample was pulled toward both sides to delaminate a portion of the sealant layer so that the portion of the sealant layer is exposed. The delaminated sealant layer was fixed to an upper jig of a universal testing machine (UTM), and the remaining portion was attached to a slide glass by using a double-sided tape and then fixed to a lower jig. Thereafter, force required to delaminate the sealant layer and the gas barrier layer was measured under conditions of a delamination rate of 50 mm/min, a grip gap of 80 mm, and a test distance of 30 nm, and the measured force was evaluated as adhesion strength.

3. Water Vapor Transmission Rate (WVRT)

Each of the pouch films manufactured through Manufacturing Example 1 and Comparative Manufacturing Examples 1 and 2 was cut to a size of 108 mm×108 mm and mounted in a WVRT tester. Then, a dry nitrogen gas which does not contain water vapor was introduced into one surface of the pouch film, and the water vapor was introduced into the other surface of the pouch film. Here, the two spaces into which the gases are respectively introduced were isolated from each other so that the gases introduced into both the surfaces of the pouch film are not mixed with each other. During the experiment, the temperature was set and maintained at 38° C., and the humidity was set and maintained at 100% RH. Also, an amount of water vapor was measured on the above-mentioned surface into which the dried nitrogen gas is introduced by using a humidity sensor for 24 hours. The amount of water vapor was divided by an area of the surface, and the amount of water vapor per unit area, which passes through the pouch film for 24 hours, was deduced and evaluated by the WVRT.

TABLE 1

|  | Manufacturing Example 1 | Comparative Manufacturing Example 1 | Comparative Manufacturing Example 2 |
| --- | --- | --- | --- |
| Flexibility [times] | 170 | 30 | 200 |
| Adhesion Strength [N/15 mm] | 3.3 | 6.2 | Not measurable |
| WVTR [g/m$^2$ · day] | $8.06 \times 10^{-3}$ | $9.6 \times 10^{-4}$ | $1.2 \times 10^{-2}$ |

As shown in Table 1 above, the pouch film according to Manufacturing Example 1 was not damaged until the bending test is performed up to 170 times, the pouch film according to Comparative Manufacturing Example 1 was not damaged until the bending test is performed up to 30 times, and the pouch film according to Comparative Manufacturing Example 2 was not damaged until the bending test is performed up to 200 times. Thus, it is seen that the pouch film according to Manufacturing Example 1 is much more flexible than that of the pouch film according to Comparative Manufacturing Example 1.

Also, the bonding strength of the pouch film according to Manufacturing Example 1 was 3.3 N/15 mm, and the bonding strength of the pouch film according to Comparative Manufacturing Example 1 was 6.2 N/15 mm. However, in the pouch film according to Comparative Manufacturing Example 2, the gas barrier layer was corroded by the electrolytic, and thus, the measurement was impossible. Thus, it is seen that the pouch film according to Manufacturing Example 1 is much more electrolyte resistance than that of the pouch film according to Comparative Manufacturing Example 1.

Also, the pouch film according to Manufacturing Example 1 had a WVTR of $8.06 \times 10^{-3}$ g/m²·day, the pouch film according to Comparative Manufacturing Example 1 had a WVTR of $9.6 \times 10^{-4}$ g/m²·day, and the pouch film according to Comparative Manufacturing Example 2 had a WVTR of $1.2 \times 10^{-2}$ g/m²·day. Thus, it is seen that the pouch film according to Manufacturing Example 1 is much more waterproof property than that of the pouch film according to Comparative Manufacturing Example 1. As described above, when the metal particles are simply deposited without being sintered, too much pores were generated between the metal particles of the pouch film according to Comparative Manufacturing Example 2, and thus, the electrolytic and moisture were easily permeated. However, the pouch film according to Manufacturing Example 1 may be improved in waterproof property and electrolyte resistance by sintering the metal particles to reduce the number of gaps between the gas barrier layers.

Therefore, it is seen that the pouch film according to an embodiment of the present invention is superior to the pouch film according to the related art in flexibility, water resistance and electrolyte resistance of the pouch.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a pouch film, the method comprising:
   applying an adhesive on one surface of a first polymer layer;
   after the applying of the adhesive, forming a gas barrier layer by: (i) first depositing metal particles on the adhesive; and then (ii) sintering the metal particles by simultaneously applying heat and a pressure to the deposited metal particles, the heat having a temperature of 50° C. to 150° C., the gas barrier layer having a thickness of 0.01 μm to 15 μm, and the pressure that is applied to the deposited metal particles is 50 MPa to 1000 MPa; and
   after the forming of the gas barrier layer, laminating a second polymer layer on one surface of the gas barrier layer.

2. The method of claim 1, wherein the first polymer layer is a surface protection layer that is an outermost layer of the pouch film, and
   the second polymer layer is a sealant layer that is an innermost layer of the pouch film.

3. The method of claim 1, wherein the first polymer layer is a sealant layer that is an innermost layer of the pouch film, and
   the second polymer layer is a surface protection layer that is an outermost layer of the pouch film.

4. The method of claim 1, wherein the metal particles comprise aluminum.

5. The method of claim 1, wherein each of the metal particles has a diameter of 0.01 μm to 15 μm.

6. The method of claim 1, wherein the gas barrier layer has a thickness of 1 μm to 14 μm.

7. The method of claim 1, wherein the pressure that is applied to the deposited metal particles is 100 MPa to 500 MPa.

8. A method for manufacturing a pouch film, the method comprising:
   applying an adhesive on one surface of a first polymer layer;
   after the applying of the adhesive, forming a gas barrier layer by: (i) first depositing metal particles on the adhesive; and then (ii) sintering the metal particles by simultaneously applying heat and a pressure to the deposited metal particles, the heat having a temperature of 50° C. to 150° C., the gas barrier layer having a thickness of 0.01 μm to 15 μm, and the pressure that is applied to the deposited metal particles is 50 MPa to 1000 MPa; and
   after the forming of the gas barrier layer, laminating a second polymer layer on one surface of the gas barrier layer,
   wherein during the depositing of the metal particles on the adhesive, a binder is mixed with the metal particles and deposited on the adhesive together with the metal particles, the binder being made of a material selected from the group consisting of: polyethylene (PE), polypropylene (PP), stearic acid (SA), polyethylene glycol (PEG), polyacetal (PA), paraffin wax, or carnauba wax (CW).

* * * * *